United States Patent [19]

Mundus

[11] Patent Number: 5,057,181

[45] Date of Patent: Oct. 15, 1991

[54] APPARATUS FOR APPLYING REINFORCING SLIPS PROVIDED WITH A GLUE COATING TO A WEB HAVING TRANSVERSE PERFORATION LINES

[75] Inventor: Friedhelm Mundus, Lengerich, Fed. Rep. of Germany

[73] Assignee: Windmoeller & Hoelscher, Lengerich, Fed. Rep. of Germany

[21] Appl. No.: 476,059

[22] Filed: Feb. 7, 1990

[30] Foreign Application Priority Data

Feb. 22, 1989 [DE] Fed. Rep. of Germany ....... 3905469

[51] Int. Cl.[5] .............................................. B32B 31/18

[52] U.S. Cl. .................................... 156/510; 156/517; 156/519; 156/522; 156/555; 156/556; 156/568; 225/93; 225/100

[58] Field of Search ............... 156/250, 256, 495, 510, 156/516, 517, 519, 522, 555, 567, 568; 225/2, 3, 4, 7, 21, 23, 34, 35, 93, 94, 98, 99, 100, 103

[56] References Cited

U.S. PATENT DOCUMENTS

| | | | |
|---|---|---|---|
| 2,466,823 | 4/1949 | Poppe | 225/100 |
| 2,999,533 | 9/1961 | Slagel et al. | 156/510 |
| 3,057,527 | 10/1962 | Hannon | 225/100 |
| 3,543,980 | 12/1970 | Brockmuller | 225/100 |
| 3,558,400 | 1/1971 | Horvath et al. | 156/510 |
| 3,818,810 | 6/1974 | Bosse | 225/100 |
| 3,942,694 | 3/1976 | Jones et al. | 225/100 |
| 4,047,474 | 9/1977 | Lany | 225/100 |
| 4,227,960 | 10/1980 | Loeffler et al. | 156/519 |
| 4,371,410 | 2/1983 | Stevens | 156/117 |
| 4,401,249 | 8/1983 | Kadlecik et al. | 225/97 |

FOREIGN PATENT DOCUMENTS

| | | |
|---|---|---|
| 2438446 | 2/1976 | Fed. Rep. of Germany . |
| 2276926 | 1/1976 | France . |
| 2401020 | 3/1979 | France . |
| 888099 | 1/1962 | United Kingdom . |

*Primary Examiner*—Caleb Weston

*Attorney, Agent, or Firm*—Fleit, Jacobson, Cohn, Price, Holman & Stern

[57] ABSTRACT

An apparatus to apply reinforcing slips provided with a glue coating to a web which has transverse perforation lines, comprising means for tearing from the web the sections which are joined at the transverse perforation lines.

6 Claims, 1 Drawing Sheet

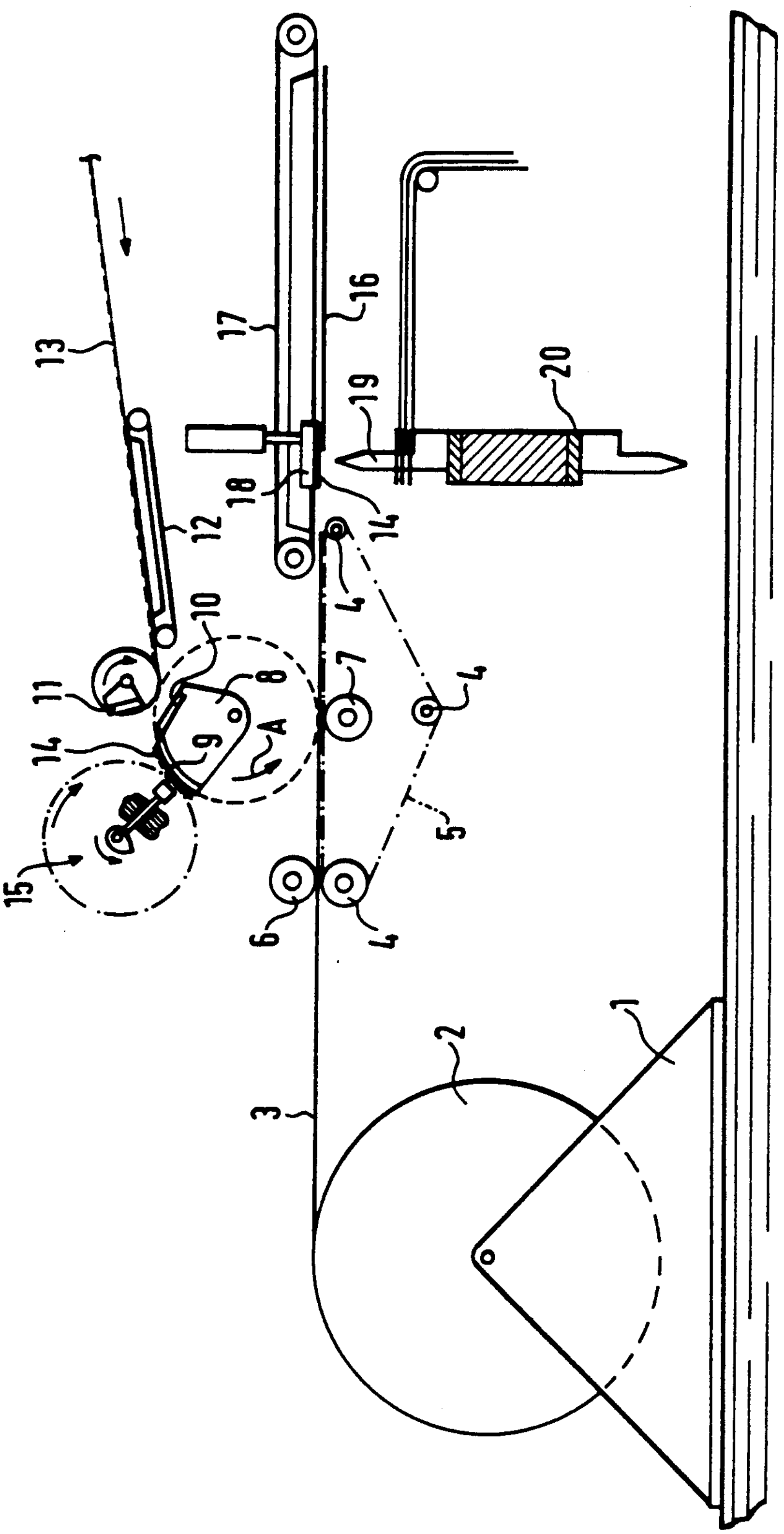
13
12
11
10
14
9
8
A
15
17
16
18
14
19
20
7
4
4
4
5
6
4
3
2
1

APPARATUS FOR APPLYING REINFORCING SLIPS PROVIDED WITH A GLUE COATING TO A WEB HAVING TRANSVERSE PERFORATION LINES

BACKGROUND OF THE INVENTION

1. Field of the Invention

This invention relates to an apparatus for applying reinforcing slips provided with a glue coating to a web that consists of bags, which are joined at the transverse perforation lines, comprising means for tearing from the web the sections or bags which are joined at the transverse perforation lines.

2. Description of the Prior Art

Bags made of plastic film can be manufactured from a web consisting e.g., of a flat continuous tubular film of synthetic thermoplastics in that the web is provided with welded transverse seams and beside said seams with transverse perforation lines so that each bag can be torn from the web along the adjacent transverse perforation line. When it is desired to form stacks of said bags, the individual bags must be torn off and stacked by a machine. In many cases it is also necessary to stick reinforcing slips to the web or to each bag; such reinforcing slips may constitute griphole reinforcements or hanger lugs.

In an apparatus which is of the kind described first hereinbefore, tearing rollers moving faster than the webs and segments for applying under pressure the slips to be stuck may be provided. But such an apparatus would be rather expensive.

SUMMARY OF THE INVENTION

It is an object of the invention to provide an apparatus which is of the kind described first hereinbefore and which has a simple design so that it can economically be manufactured.

In an apparatus of the kind described first hereinbefore that object is accomplished in accordance with the invention in that a belt conveyor is provided, which consists of spaced apart endless conveyor belts, which are trained around receiving-end belt pulleys, a conveyor roller is disposed above said receiving-end reversing pulleys and urges the incoming web against the reversing pulleys, the conveying belts are supported in their upper course by a supporting roller, which is spaced behind the receiving-end reversing pulleys by a distance which is smaller than the spacing of the transverse perforation lines of the web, the supporting roller constitutes a backing roller for cooperating with a rotating segment, which has a cylindrical peripheral surface and serves to hold and transport the reinforcing slips, the radius and the surface speed of the peripheral surface of said segment are so selected in dependence on the length of the sections of the web that said segment urges each section of the web against the backing roller and causes a portion of each section of the web to be in rolling contact with the backing roller between two conveying belts, and the surface speed of the segment and of the backing roller exceeds the conveying speed of the belt conveyor so that a slip is stuck on each section and each section is torn from the web.

In the apparatus in accordance with the invention the rotating segment performs a dual function. In the first place the slip to be stuck is urged by the segment against a web section which is to be provided with the slip and to be torn off. In the second place the segment acts as a tearing element for intermittently engaging the web. Because the web which is moved at the speed of the belt conveyor is retained between the receiving-end reversing pulleys and the conveyor roller cooperating with said pulleys, each web section will be torn off along a transverse perforation line by the segment, which rotates at a higher surface speed and cooperates with the backing roller.

To ensure a uniform tearing, segments serving only to apply pressure may be provided in addition to the segment used to stick on the slips.

It will be understood that a plurality of slip-applying segments may be provided.

To retain the glue-coated slips, the segment is desirably provided in its peripheral surface with air-sucking openings or with at least one air-sucking passage. Air can be sucked from the air-sucking nozzles or air-sucking slots in the peripheral surface in the usual manner through so-called rotary leadthroughs.

Also within the scope of the invention a knife edge may be provided adjacent to the trailing edge of the peripheral surface of the segment and may cooperate with a rotating backing knife edge to sever the slips from a web of slip material which is being fed.

It is often necessary to provide the slips with griphole openings or stacking holes. For this reason it is within the scope of the invention that the peripheral surface of the segment cooperates with a rotating punch of a punching device, which punch rotates at the same surface speed as the segment.

If the slips are desired to constitute lugs, e.g., for stacking the web sections, a slip may be forced against each web section near its trailing end to protrude from the edge which has been formed by the tearing.

Also within the scope of the invention the belt conveyor may be succeeded by a suction belt conveyor having a conveying lower course and is disposed above a stacking belt conveyor, which carries intermittently advanced stacking pins, and the sections are needled onto said stacking pins by a punch, which is adapted to be lifted and lowered and causes the stacking pins to extend through the stacking holes which have been punched into the slips.

BRIEF DESCRIPTION OF THE DRAWING

The single FIGURE of the drawing is a diagrammatic side elevation showing an apparatus for applying reinforcing slips to sections which are to be torn from a web.

DETAILED DESCRIPTION OF THE PREFERRED EMBODIMENT

An illustrative embodiment of the invention will now be explained more in detail with reference to the drawing.

A wound roll 2 is rotatably mounted in an unwinder 1. A web 3 is withdrawn from that wound roll 2 by means of a plurality of laterally spaced apart lower endless belts 5, which are trained around pulleys 4, and by means of axially aligned, spaced apart upper rollers 6. The web 3 consists of a series of diaper bags, which are joined at perforation lines, not shown. Backing rollers 7 are provided adjacent to the spaces between the endless belts 5 and cooperate with a segment 8. The latter is provided with a suction passage 9 and with a knife edge 10. That knife edge 10 and a rotating backing knife 11 cooperate in such a manner that consecutive slips 14 are severed from a glue-coated continuous web 13, which is supplied by means of a suction belt 12, and each slip is then held at the suction passage 9. As is apparent from the drawing the rotating knife and, in addition, a rotating punching device 15 are associated with the segment 8. That punching device serves to punch holes into the several slips 14. As the rotational movement of the segment 8 in the direction indicated by the arrow A is continued, each slip 14 is forced onto a diaper bag 16 by the cooperation of the segment 8 with the backing rollers 7. At the time at which the segments 8 first contact the web 3, the segments 7 and the spaced apart parallel segments 8 move faster than the web so that the segments 8 will then tear a diaper bag 16 from the web. It is apparent that the segments 8 serve to tear individual diaper bags 16 from the web 3, which consists of a series of diaper bags, and also serve to force slips, e.g., reinforcing slips, against respective diaper bags. By the belts 5, the diaper bags 16 to which repective slips 14 have been stuck are then removed by an upper suction belt 17 from the conveying belts 5 and under the action of a depressing member 18 are deposited in a manner known per se on the pins 19 of a stacking belt 20.

I claim:

1. An apparatus for applying reinforcing slips provided with a glue coating to a web which has transverse perforation lines, comprising means for tearing from the web sections which are joined at the transverse perforation lines, characterized in that a belt conveyor is provided, which consists of spaced apart endless conveyor belts, which are trained around receiving-end reversing pulleys, a conveyor roller is disposed above said receiving-end reversing pulleys and urges the web against said receiving-end reversing pulleys, the conveying belts are supported in their upper course by a supporting roller, which is spaced behind the receiving-end reversing pulleys by a distance which is smaller than the spacing of the transverse perforation lines of the web, the supporting roller constitutes a backing roller for cooperating with a rotating segment, which has a cyclindrical peripheral surface and serves to hold and transport the reinforcing slips, the radius and the surface speed of the peripheral surface of said segment are so selected in dependence on the length of the sections of the web that said segment urges each section of the web against the backing roller and causes a portion of each section of the web to be in rolling contact with the backing roller between two conveying belts, and the surface speed of the segment and of the backing roller exceeds the conveying speed of the belt conveyor so that a slip is stuck on each section and each section is torn from the web.

2. An apparatus according to claim 1, characterized in that the segment is provided in its peripheral surface with air-sucking openings or with at least one air-sucking passage.

3. An apparatus according to claim 1, characterized in that a knife edge is provided adjacent to the trailing edge of the peripheral surface of the segment and cooperates with a rotating backing knife to sever the slips from a web of slip material which is being fed.

4. An apparatus according to claim 1, characterized in that the peripheral surface of the segment cooperates with a rotating punch of a punching device, which punch rotates at the same surface speed as the segment.

5. An apparatus according to claim 1, characterized in that a slip is forced against each web section near its trailing end to protrude from the edge which has been formed by the tearing.

6. An apparatus according to claim 1, characterized in that the belt conveyor is succeeded by a suction belt conveyor having a conveying lower course and is disposed above a stacking belt conveyor, which carries intermittently advanced stacking pins, and the sections are needled onto said stacking pins by a punch, which is adapted to be lifted and lowered and causes the stacking pins to extend through the stacking holes which have been punched into the slips.

* * * * *